UNITED STATES PATENT OFFICE.

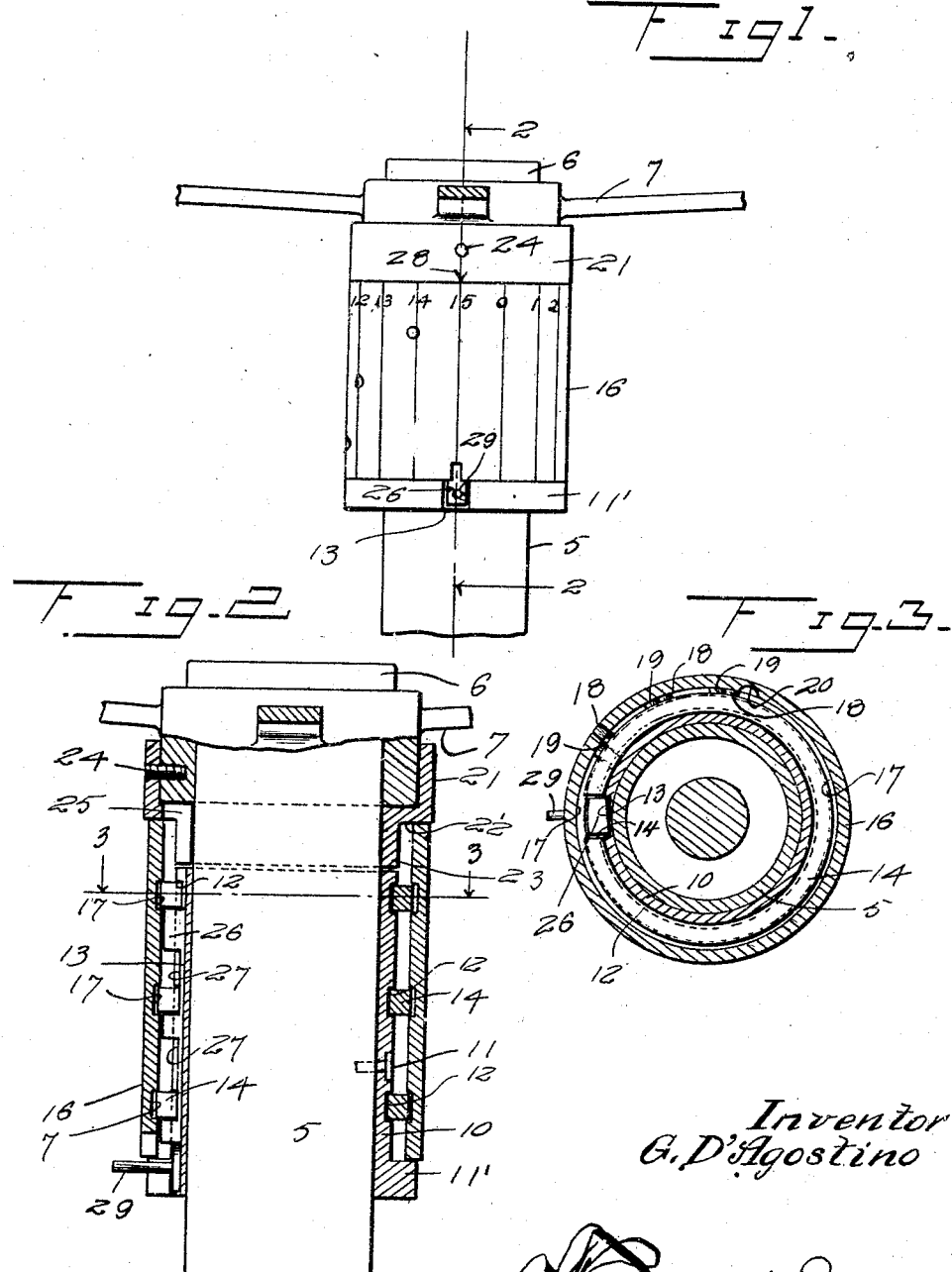

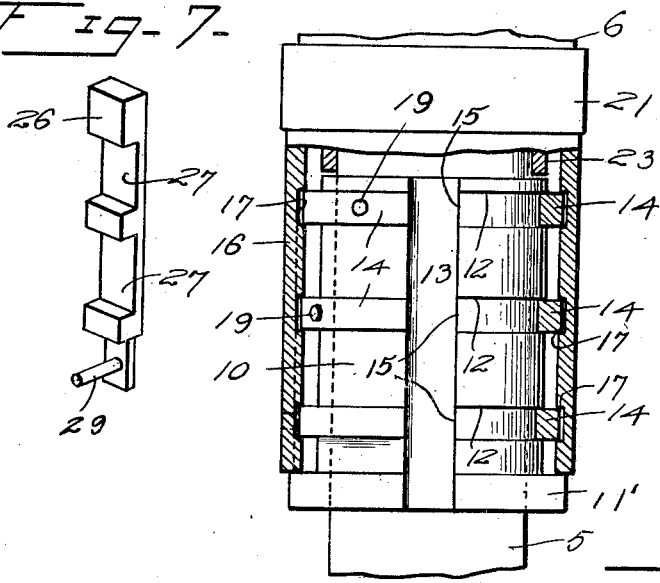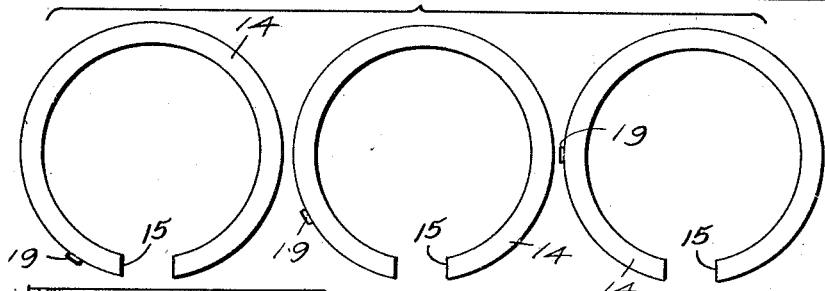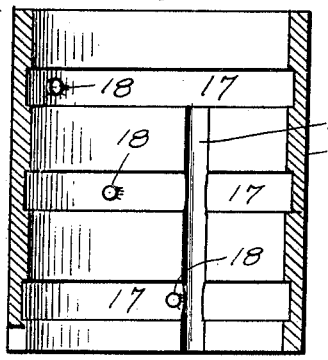

GIUSEPPE D'AGOSTINO, OF NIAGARA FALLS, NEW YORK.

STEERING-WHEEL LOCK.

1,366,719.  Specification of Letters Patent.  Patented Jan. 25, 1921.

Application filed April 28, 1920. Serial No. 377,309.

*To all whom it may concern:*

Be it known that GIUSEPPE D'AGOSTINO, a citizen of the United States, residing at Niagara Falls, in the county of Niagara and State of New York, have invented certain new and useful Improvements in Steering-Wheel Locks; and I do hereby declare the following to be a full, clear, and exact description of the invention, such as will enable others skilled in the art to which it appertains to make and use the same.

This invention relates to automobile steering wheel locks, and has for its primary object the provision of a lock to be associated with the steering post and wheel to lock the latter against rotation, thereby preventing the theft of the automobile.

Another object of the invention is to provide a combination lock to prevent the rotation of the steering wheel of an automobile and which lock is at all times associated with the steering wheel and steering post so that the same may be readily locked to prevent an unauthorized person from operating the steering wheel.

A further object of the invention is to provide a lock of the above stated character which is so constructed as not to be cumbersome and interfere with the operation of the wheel but which is disposed out of the driver's way and where it can be readily operated to lock the wheel.

A still further object of the invention resides in the provision of a steering wheel lock which has the parts so arranged as to prevent the same from being tampered with for the purpose of unlocking the lock, and which is of such a make up as to be quickly opened by the person knowing the proper combination.

The invention has for a still further object, the provision of a lock of the above stated type which will be composed of the minimum number of parts and of simple construction and operation and therefore comparatively inexpensive.

With the foregoing and other objects in view as will appear as the description proceeds, the invention consists in the novel combination, construction and arrangement of coöperating parts as will be hereinafter more specifically set forth, pointed out in the claims and shown in the accompanying drawings forming a part of this application and in which:

Figure 1 is an elevation of a steering wheel and post having my improved lock in operative position thereon.

Fig. 2 is a longitudinal sectional view taken on line 2—2 of Fig. 1.

Fig. 3 is a transverse sectional view taken on line 3—3 of Fig. 2.

Fig. 4 is a section of one of the elements embodied in the invention.

Fig. 5 is a detail view of the locking rings to be associated with the member shown in Fig. 4.

Fig. 6 is a view of the assembled lock having parts broken away to show the locking bolt in retracted position.

Fig. 7 is a perspective of the locking bolt.

Referring in detail to the drawings wherein like characters of reference designate corresponding parts throughout the several views, the numeral 5 designates the usual steering post column and 6 and 7 the steering post and wheel respectively. These parts form no part of the present invention but are referred to merely to illustrate the application of my improved lock.

The lock consists of a post receiving sleeve 10 which is fixed to the column by fastenings 11 and is provided with an annular collar 11' at its lower end. The sleeve 10 is provided with circumferential grooves 12 upon its outer face and is further provided with a longitudinal groove 13 which intersects the annular groove and is of a greater depth than the latter, the groove 13 extending through the annular collar 11'. Rotatable in each of the grooves 12 is a split locking ring 14 the ends of which are separated to afford openings 15 of substantially the same width as the longitudinal groove 13.

Receiving the sleeve 10 and rotatable thereon is a barrel or cylinder 16 one end of which rests against the circumferential collar 11' on the sleeve. The inner face of the barrel is provided with circumferential grooves 17 which coincide with the circumferential grooves 12 on the outer face of the sleeve, to accommodate the locking rings 14. Outstanding lugs 18 are disposed in the grooves 17 and are adapted to be engaged by similar outstanding lugs 19 disposed upon the outer face of the various locking rings 14 at different distances from the respective openings thereof. The lugs 18 are arranged in offset relation and when the cylinder is rotated these lugs are adapted to engage the lugs 19 and rotate the rings sufficiently to bring the openings therein in registration with the longitudinal groove in the sleeve. This barrel or cylinder 16 is also provided with a longitudinal groove 20 which intersects the annular groove 17, the purpose of which will presently appear.

A collar 21 is received by the hub of the steering wheel and is formed with an inwardly directed flange 22 and an annular flange 23 at its inner edge, the latter flange being fixed to the hub by a fastening 24. An opening 25 is adapted to receive one end of a locking bolt 26 slidably mounted in the groove 13. This locking bolt which is clearly illustrated in Fig. 7 is substantially rectangular in cross section and is provided with substantially rectangular recesses 27 in its outer face, the recesses being disposed in alinement with the locking rings 14 which when the bolt is projected retain the bolt in operative position and against withdrawal.

A scale of characters which may be numbers are inscribed upon the upper edge of the cylinder and are adapted to be brought in registration with an indicating arrow 28 upon the collar 21 at a point at the direct center of the bolt receiving opening 25. A certain combination of the characters are in coinciding relation to the lugs 19 and upon successively bringing the proper characters in registration with the indicating arrow the rings will be rotated to dispose the opening in each of the same in alinement and in coinciding relation with the longitudinal groove 13. It is to be understood that the cylinder should be rotated in first one direction and then another, the direction and distance of rotation of the cylinder being determined by the arrangement of the parts 18 and 19. The operator may then grasp the laterally extending pin 29 on the lower end of the locking bolt 26 and retract the same from the opening 25. The locking bolt 26 has a laterally extending pin 29 upon its lower end by which the locking bolt may be operated.

From the foregoing it will be seen that the combination must be known to the party operating the lock, thereby preventing the steering wheel from being released from the steering column by an unauthorized party.

While the preferred embodiments of the invention have been shown and described, it will be understood that minor changes in the details of construction and arrangement of parts may be resorted to within the scope of what is claimed without departing from the spirit of the invention.

What is claimed is:—

1. In a lock, a sleeve adapted to receive a stationary member and fixed thereto, said sleeve being provided with a plurality of parallel circumferential grooves in the outer face and further provided with a longitudinal groove which intersects the circumferential grooves, a plurality of locking rings each provided with an opening adapted to register with the longitudinal groove, a rotatable collar adapted to be fixed to a rotatable member to be locked, and provided with a bolt receiving opening, a bolt slidable in the longitudinal groove and provided with recesses in one face thereof to coincide with the circumferential grooves to receive the locking rings to retain the bolt in locked position, a rotatable cylinder disposed on the sleeve, and coöperating elements carried by the rings and said cylinder adapted to rotate the rings to dispose the openings therein in alinement and in registration with the grooves to permit the locking bolt to be retracted.

2. In a lock, a sleeve adapted to receive a stationary member and fixed thereto, said sleeve being provided with a plurality of parallel circumferential grooves in the outer face and further provided with a longitudinal groove which intersects the circumferential grooves, a plurality of locking rings each provided with an opening adapted to register with the locking slot, a rotatable collar adapted to be fixed to a rotatable member to be locked, and provided with a bolt receiving opening, a bolt slidable in the groove and provided with recesses in one face thereof to coincide with the circumferential grooves to receive the locking rings to retain the bolt in locked position, a rotatable cylinder disposed on the sleeve, a lug carried by each of the rings and lugs carried by the cylinder adapted to engage the first mentioned lugs to rotate the rings, the lugs being arranged in corresponding offset relation whereupon alternately rotating the cylinder the proper distances in reverse directions the rings will be rotated to dispose the openings therein in regisration with the groove.

3. In a lock, a sleeve to be mounted upon and fixed to a stationary member and provided with circumferential grooves and further provided with a longitudinal groove which intersects the circumferential grooves, a cylinder rotatable on the sleeve and also provided with circumferential grooves coinciding with the grooves on the sleeve, rings accommodated in the grooves on sleeve and cylinder and each being provided with an opening adapted to be disposed in alinement with the longitudinal groove, a collar adapted to be mounted upon the rotatable member to be locked against rotation and provided with a bolt receiving opening, and a bolt slidable in the groove and provided with recesses to receive the rings, the latter retaining the bolt in locked position, and coöperating means between the rings and cylinder to successively rotate the rings when the same are in position to permit the bolt to be withdrawn.

In testimony whereof I affix my signature in presence of two witnesses.

GIUSEPPE D'AGOSTINO.

Witnesses:
    AMELIA D'AGOSTINO,
    SPENCER B. PARKER.